(12) United States Patent
Hilleman

(10) Patent No.: US 6,701,862 B2
(45) Date of Patent: Mar. 9, 2004

(54) BOW MOUNTED SYSTEM AND METHOD FOR JET-PROPELLING A SUBMARINE OR TORPEDO THROUGH WATER

(76) Inventor: Terry B. Hilleman, 1911 Knollwood Dr., Marshalltown, IA (US) 50158

( * ) Notice: Subject to any disclaimer, the term of this patent is extended or adjusted under 35 U.S.C. 154(b) by 0 days.

(21) Appl. No.: 10/164,730

(22) Filed: Jun. 6, 2002

(65) Prior Publication Data

US 2002/0152947 A1 Oct. 24, 2002

Related U.S. Application Data

(63) Continuation-in-part of application No. 09/718,753, filed on Nov. 22, 2000.
(60) Provisional application No. 60/167,464, filed on Nov. 24, 1999.

(51) Int. Cl.[7] .................................................. B63G 8/08
(52) U.S. Cl. ........................ 114/338; 440/47; 114/67 R
(58) Field of Search ............................ 114/67 R, 67 A, 114/338; 440/47, 68

(56) References Cited

U.S. PATENT DOCUMENTS

| | | |
|---|---|---|
| 3,606,857 A | 9/1971 | Sundquist |
| 3,646,903 A | 3/1972 | Hansson |
| 3,779,199 A | 12/1973 | Mayer |
| 3,973,392 A | 8/1976 | Hallqvist |
| 4,316,722 A | 2/1982 | Aschauer |
| 4,346,662 A | 8/1982 | Rogers |
| 4,680,017 A | 7/1987 | Eller |
| 4,681,508 A | 7/1987 | Kim |
| 4,831,297 A | 5/1989 | Taylor |
| 4,902,254 A | 2/1990 | Chas |
| 5,167,552 A | * 12/1992 | Johnson, III ................. 441/74 |
| 5,252,875 A | 10/1993 | Veronesi |
| 5,383,801 A | 1/1995 | Chas |
| 5,438,947 A | 8/1995 | Tam |
| 5,551,369 A | 9/1996 | Shen |
| 5,601,047 A | 2/1997 | Shen |
| 5,634,419 A | 6/1997 | Cymara |
| 5,722,864 A | 3/1998 | Andiarena |
| 6,427,618 B1 | 8/2002 | Hilleman |

OTHER PUBLICATIONS

"Jet Engine"; Encyclopedia Americana, International Edition, vol. 16, pp. 47–51, published by Grolier, Inc., Danbury, Conneticut, 1987.

"Fluids in Motion"; Introduction to College Physics, by Roger D. Rusk, pp. 173–181, published by Appleton–Century–Crofts, Inc., New York, New York, 1954.

* cited by examiner

*Primary Examiner*—Jesus D. Sotelo
(74) *Attorney, Agent, or Firm*—McKee, Voorhees & Sease, P.L.C.

(57) ABSTRACT

A jet propulsion system for a submersible vehicle, such as a submarine includes a propulsion unit mounted away from the stern of the submersible. Generally, the propulsion system consists of a set of blades secured to a hub within a shroud. Combining such a propulsion system with a surface texture treatment greatly reduces overall drag while improving the submersible's efficiency. Further, such an arrangement contributes to the submersibles stealthy characteristics. An additional hub and set of high-speed blades capable of generating a supercavity may be added to achieve supercavitation. The propulsion system can be varied to include a pumpjet and/or a centrifugal force blade system.

15 Claims, 8 Drawing Sheets

BOW MOUNTED SYSTEM AND METHOD FOR JET-PROPELLING A SUBMARINE OR TORPEDO THROUGH WATER

CROSS-REFERENCE TO RELATED APPLICATION

This application is a continuation-in-part of and claims the benefit of U.S. patent application Ser. No. 09/718,753 filed on Nov. 22, 2000 which claims the benefit of U.S. Provisional Application Ser. No. 60/167,464 filed Nov. 24, 1999.

BACKGROUND OF THE INVENTION

1. Field of the Invention

The present invention relates generally to aquatic propulsion systems and more specifically to a propulsion system, located generally in the front and rear of a submersible device, such as a submarine or torpedo.

2. Problems in the Art

Currently, underwater vehicles, such as nuclear powered submarines, are propelled through the water using a propeller based propulsion system located only at the stern of the vehicle. Drag forces acting on the vehicle cause the water in front of, and around, the vehicle to become displaced and turbulent in nature. Propeller based propulsion systems located at the stern are forced to push the submarine against this resultant turbulent water. These drag forces lead to decreased efficiency and a lower overall thrust.

Further, these propeller-based propulsion systems cause an increase in a submarine's noise with an increase in speed. This may aid others in detecting the submarine, thereby enabling its destruction. The increase in noise is due largely to cavitation. Cavitation is the formation of noisy water vapor bubbles. Rapid propeller movement creates a vacuum-like area in the incompressible water. The vapor pressure of the water forms the bubble. Surrounding water pressure soon collapses the bubble, violently, creating noise.

As the speed of the submarine increases, the geometrically increasing wave, generated by water resistance, limits the increase in speed and contributes to cavitation (propeller noise). This wave is the main resistance to high speed in surface vessels and plays a role in submarine speed increase, albeit less when the submarine is at a depth of greater than three submarine diameters below the surface.

In addition, as submarine speed increases, surface friction from turbulence-related viscous shear stress, creates a boundary layer of retarded fluid along the surface of the moving vessel, which also causes drag. In this boundary layer, eddies of high-speed fluid contact the surface, causing deceleration and sap the watercraft's momentum. This boundary layer turbulence increases in magnitude as flow progresses rearward from the bow; thus nearly all of the vehicle's surface boundary layer is turbulent, worsening as speed increases. The friction or drag of a turbulent boundary layer is seven to ten times that of a laminar boundary layer, so the possibility of achieving significant reductions in vehicle drag, by boundary layer management, is attractive.

There have been attempts to reduce boundary layer friction on submarines. Rogers in U.S. Pat. No. 4,346,662 uses a twin hull design with extensive slots in the outer hull. These are kept open by a backflush pump in the bow at low speed. At high speeds, the bow pump is inactivated, while the main pump at the stern exhausts water that has been pulled through the slots by suction; this is the sub's main propulsion. High Reynolds numbers (friction) limited practical application.

Mayer also discusses boundary layer control in U.S. Pat. No. 3,779,199. It did not solve the boundary layer problem beyond the bow, where the problem mainly exists; the preceding Rogers patent, which followed nearly ten years later, addressed this. The Mayer patent also eliminated the conventional propeller and rudder; this loses efficiency due to poor management of the turbulent slipwater at the stern. The intake diameter did not approach the submarine diameter. The water exited through a large number of exit ports. The large numbers of parallel exit ports (slots) were arranged in a number of concentric rings at the bow; these were used for directional flow and the only source of propulsion. Due to aforementioned reasons, the Mayer patent was not utilized in a practical submarine application.

Short of significantly reducing surface resistance and wave generation by other means, submarine speed at stealth is slow, and top speed is below that of important surface ships, such as an aircraft carrier. Submarine surfaces are presently coated with rubber to make it less reflective to sonar and mute submarine noise. Stealth is the priority with submarines; it has always been the priority.

Surface water vehicles typically rely on a propeller fan, either by an inboard or outboard stern positioned engine, for propulsion. This application of power to the rear end creates an inverted pendulum, with stability problems. This stern drive requires the vehicle to be pushed through the water, which generates geometrically disproportionate wave drag resistance with any increase in speed; it is the main obstacle to increased speed for the surface water vehicle. This wave arises from displacing all of the incompressible water in front of the vehicle, to around and behind the vehicle. This frontal wave generation limits stability, efficiency and speed.

Currently, most improved water jet engines on surface crafts are placed at the stern of craft and exhaust the water outward, above the waterline. They are still subject to the preceding limitations of stern-drive only. They are a variation of the original water-jet engine that accelerates water through a curved passageway.

Attempts have been made to address these problems for water surface vehicles. U.S. Pat. No. 5,634,419 to Cymara discloses what is called a "front-drive boat" wherein a propeller propulsion system is located towards the front (bow) of the boat, which is claimed to increase stability of the boat.

U.S. Pat. No. 4,680,017 to Eller, entitled "motorboat propeller guard for improved performance", places a propeller inside a housing, with grids configured to attempt to direct propelled water rearwardly for improved performance. It is jet-like and somewhat similar to the stern pumpjet used on modern stealth submarines, which followed earlier torpedo pumpjet designs. Cavitation (generation of noisy water vapor bubbles) was reduced in the pumpjet through pressurizing the propeller blade area and eliminating the propeller tip vortices, making higher speeds at stealth possible.

Herein incorporated by reference, U.S. Pat. No. 5,383,801 to Chas, U.S. Pat. No. 4,902,254 to Chas, U.S. Pat. No. 4,831,297 to Taylor et al., disclose propulsion systems for over the watercraft that adopt jet engine principles to attempt to increase propulsion. Another propeller based propulsion systems is U.S. Pat. No. 5,252,875 to Veronesi, et al., herein incorporated by reference. Many of the above patents resemble a jet engine in appearance and further resemble a jet engine in the manner in which they are attached to a vehicle; i.e. they hang down from the craft. They still have to push a boat through the water, causing wave displacement that increases geometrically with speed. None have twin jet accelerators in sequence. None are capable of higher stealth speed or supercavitation.

Therefore, although attempts have been made to apply jet engine principles to the above water craft, and attempts have been made to increase stability of over the water craft, submarine propulsion systems have remained relatively the same, utilizing stern drive propeller fan propulsion.

There is therefore a need for a submarine propulsion system, which avoids these and other problems in the art.

FEATURES OF THE INVENTION

A general feature of the present invention is the provision of a propulsion system for a submersible, which overcomes the problems found in the prior art.

Another feature of this invention is the provision of a propulsion system for a submersible that reduces drag caused by wave generation.

A still further feature of the present invention is the provision of a propulsion system for a submersible that reduces drag caused by surface friction.

Another feature of the present invention is the provision of a propulsion system for a submersible, which has improved stealth at higher speeds.

A further feature of the present invention is the provision of a propulsion system for a submersible that improves the speed of the submersible.

A further feature of the present invention is the provision of a propulsion system for a submersible which is capable of producing high thrust and/or supercavity formation.

A further feature of the present invention is the provision of a propulsion system for a submersible that has improved efficiency.

A still further feature of the present invention is the provision of a bow-mounted propulsion system for a submersible, which uses one or more nozzles.

Another feature of the present invention is the provision of a propulsion system for a submersible which uses two or more propellers in sequence.

A still further feature of the present invention is the provision of a propulsion system for a submersible, which is located at, or towards the bow of the submarine, as well as on the stern.

Another feature of the present invention is the provision of a propulsion system for a submersible that improves on crew safety by having both fore and aft propulsors.

A further feature of the present invention is a propulsion system for a submersible which is more stable and maneuverable.

These, as well as other features and advantages of the present invention, will become apparent from the following specification and claims.

SUMMARY OF THE INVENTION

The present invention generally comprises a propulsion system for a submersible or underwater vehicle, such as a submarine or torpedo. The propulsion system generally comprises a propeller mounted on a hub which forces water into an inlet and out an outlet through a nozzle, thereby increasing the water's velocity and producing a propelling force. It is a high pressure to high velocity device.

In a preferred embodiment, the present invention includes a nuclear submarine wherein the propulsion system is located traditionally at the stern, and additionally at the bow of the submarine. The propulsion system is a propeller-based system. A bow propeller is housed in a shroud, which is dynamically shaped to provide an outer airfoil/hydrofoil effect and provide an inner inlet and outlet for water. Water passing through the inlet is accelerated by the propeller and forced into a nozzle region defined by the shroud and the remaining body of the submarine. The inlet to the shroud is covered by a guard, which aids in keeping sea debris from entering the shroud space.

The jet propelling force produced can reduce frontal pressure wave drag, to increase speed. Slight divergence of the jet exhaust away from the submarine, and surface modification of the submarine (in boundary layer problem areas) may also decrease surface drag (below the speed of cavitation), to complement the reduced frontal drag, further increasing the speed of stealth. Another embodiment can also generate a supercavity, which has negligible drag and will permit very high speeds.

BRIEF DESCRIPTION OF THE DRAWINGS

FIG. 8 illustrates three types of texturing.

DETAILED DESCRIPTION OF THE PREFERRED EMBODIMENT(S)

The present invention will be described as it applies to its preferred embodiment. It is not intended that the present invention be limited to the described embodiment. It is intended that the invention cover all modifications and alternatives, which may be included within the spirit and scope of the invention.

Figure 1:
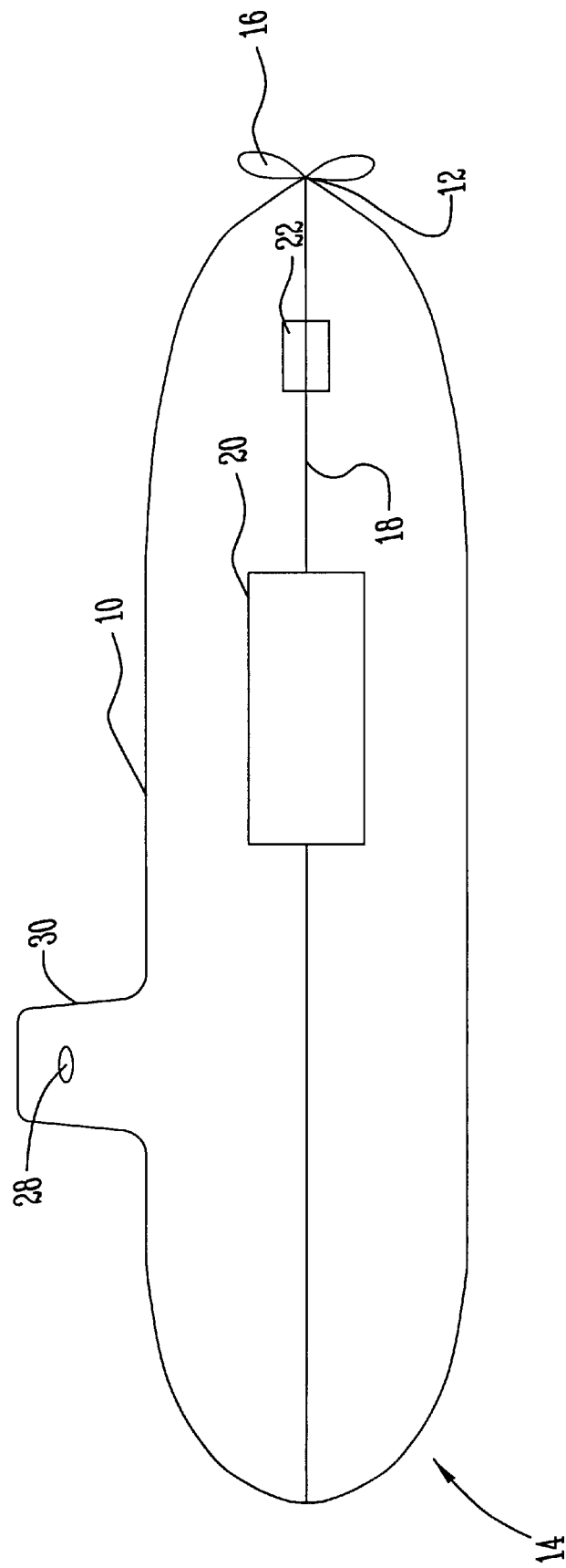
FIG. 1 is a pictorial view of a conventional rear propeller driven submarine.

Referring to the drawings, FIG. 1 depicts the general arrangement of a conventional submarine 10. A propeller 16 is located at the stern 12 of the submarine 10. Propeller 16, is driven by an axle 18, which is connected to an engine or a steam turbine 20 that can be powered by a nuclear reactor. A transmission 22 converts rotational power of axle 18 into a desired rotational speed for the propeller 16.

Figure 2:
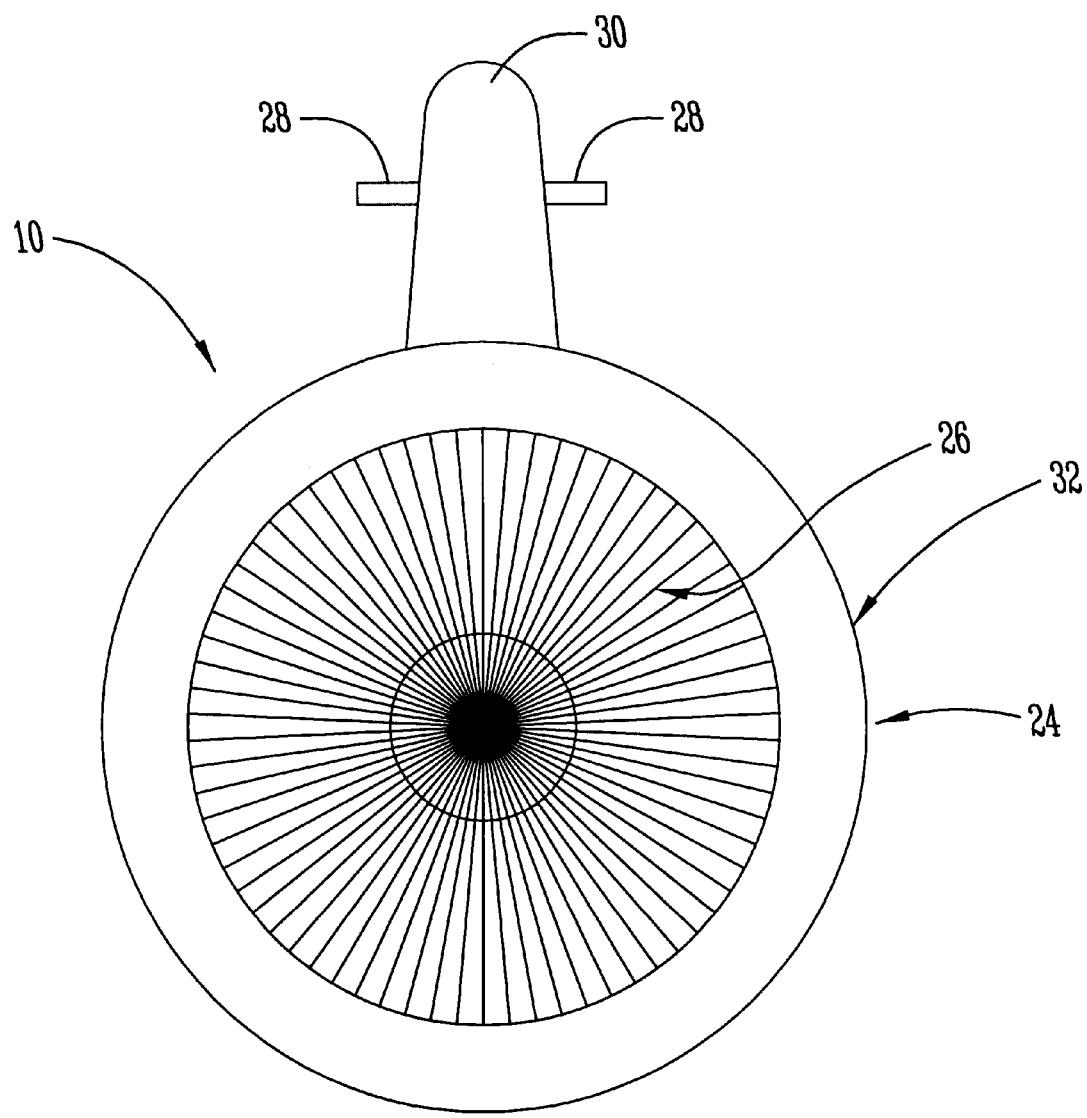
FIG. 2 is a front elevation view of a submarine according to an embodiment of the present invention.
Figure 3:
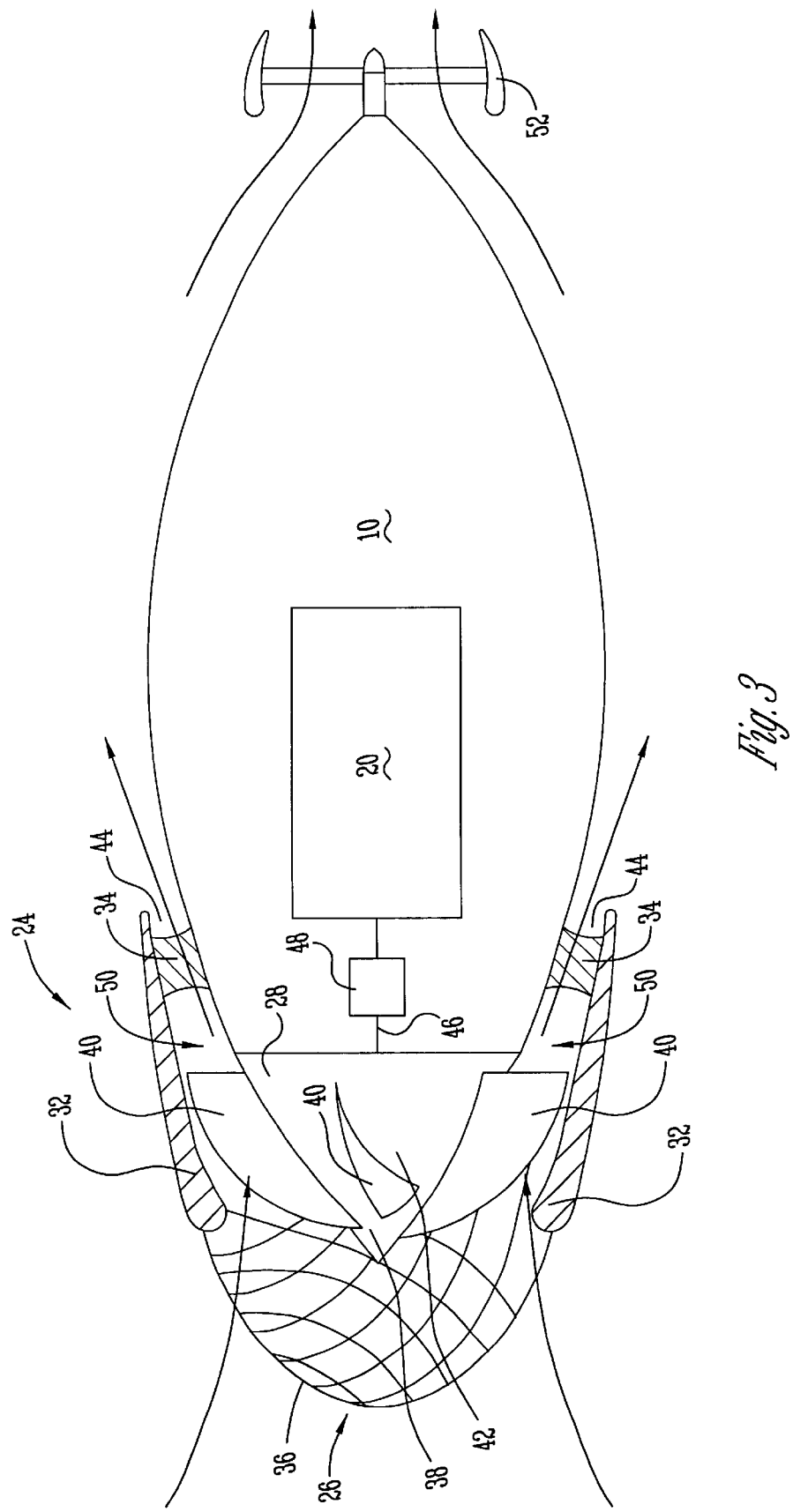
FIG. 3 is a cross-sectional side elevational view of showing one embodiment of a propulsion system.

FIGS. 2 and 3 illustrate a submarine 10 with a propulsion unit 24 located at the very bow 14 of submarine 10. However, the inlet 26 for the propulsion unit 24 may be located anywhere on the submarine 10 which is prior to the separation point at which water flowing around the submarine 10 transitions from primarily laminar to primarily turbulent flow. Moving the bow propulsion unit 24 towards the transition area may provide better boundary layer management further aft, as well as to make it possible to retain the bow sonar dome. The propulsion unit 26 may also be located or attached to flaps on the side of the submarine or to the sail.

Figure 6:
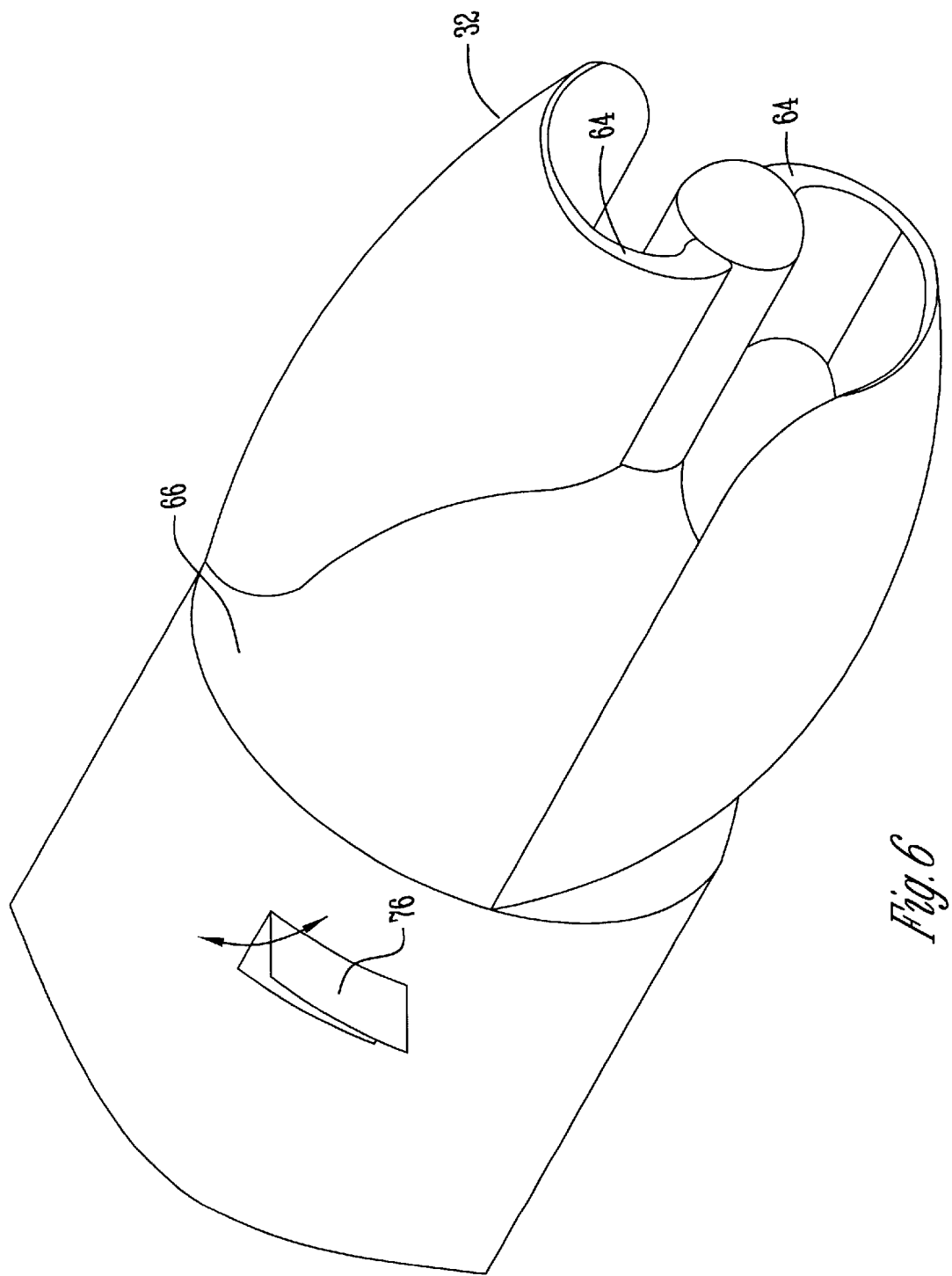
FIG. 6 is a perspective view of another embodiment of the present invention incorporating a centrifugal supercavitating hub.

As shown in FIG. 3, the propulsion unit 26 comprises a shroud 32, which is secured to the submarine 10 via a plurality of vanes 34. These vanes 34 are dynamically shaped to introduce a minimal amount of disturbance into the flow. The propulsion unit 24 could include several flaps or rudders (not shown) to manipulate the flow of water through the shroud 32 to provide maneuvering functions for the submarine 10; alternatively, the flaps or rudders could be placed on the submarine body as shown in FIG. 6. When the bow propulsion unit 24 is combined with a rear propeller 16, the couple effect increases maneuverability, making pin wheeling possible, in theory.

116 Prior to the vanes 34, the shroud inlet 26 is preferably covered by a mesh or screen 36, which aids in keeping the propulsion unit free of seawater debris. Water flows through screen 36 and into the area enclosed by shroud 32. The shroud 32 is dynamically shaped to accommodate the flow of water. As is illustrated in FIG. 2, it is preferred that almost the entire front of the submarine 10 is an inlet 26 for water. The propulsion unit 24 has a propeller component that resides within shroud 32. The propeller apparatus 38 has blades 40 secured to a hub 42. A fluid pathway exists between the front inlet 26 and back outlet 44, enclosed by shroud 32 and the body of the submarine 10.

In operation of the propulsion unit 24, the blades 40 are spun on the hub 42 at a rate so as not to cause unwanted cavitation and thereby decreased efficiency and increased noise. The propulsion unit 24 may be secured within shroud 32 so as to reduce the turbulence generated by propulsion unit 24. Water is given added momentum by propulsion unit 24 and it then flows past propulsion unit 24.

Hub 42 is operatively secured to the main body of the submarine 10. Within submarine 10, hub 42 is powered by a steam turbine, in turn powered by an engine or power source 20, which is typically of the nuclear variety. Electric, diesel, and other sources of power may be used. Upon the application of power from the engine 20 to hub 42 through a drive shaft 46, which may include a transmission 48, hub 42 spins. This spin turns the blades 40, which in turn adds momentum to the water in the shroud 32.

The water from the inlet 26 flows past the propulsion unit 24 into the nozzle region 50. The nozzle region 50 is dynamically designed to provide maximum efficiency. This nozzle region 50 resembles the nozzle region for the secondary stream of airflow found in current jet turbofan engines with high bypass ratios. The nozzle region 50 is defined by the inner surface of the shroud 32 and an exterior surface of the submarine 10. It forms a single circular exhaust ring around the bow area. Essentially, the nozzle region 50 defines an ordinary plug type nozzle commonly known in the art. Notably, the trailing edge of the shroud is shaped to minimize cavitation at stealth speed; it may have other cavitation-related modifications. It is believed that this twin jet arrangement is more efficient at higher cruising speeds. Jet power principles are utilized to pull in water and force it through the nozzle region 50. The water is ejected at a n increased velocity directly back, slightly diverged form the exterior surface of submarine 10. This minimizes boundary lager turbulence drag along the exterior surface of the submarine 10 by creating a counter-flow turbulence in a positive direction.

Figure 4:
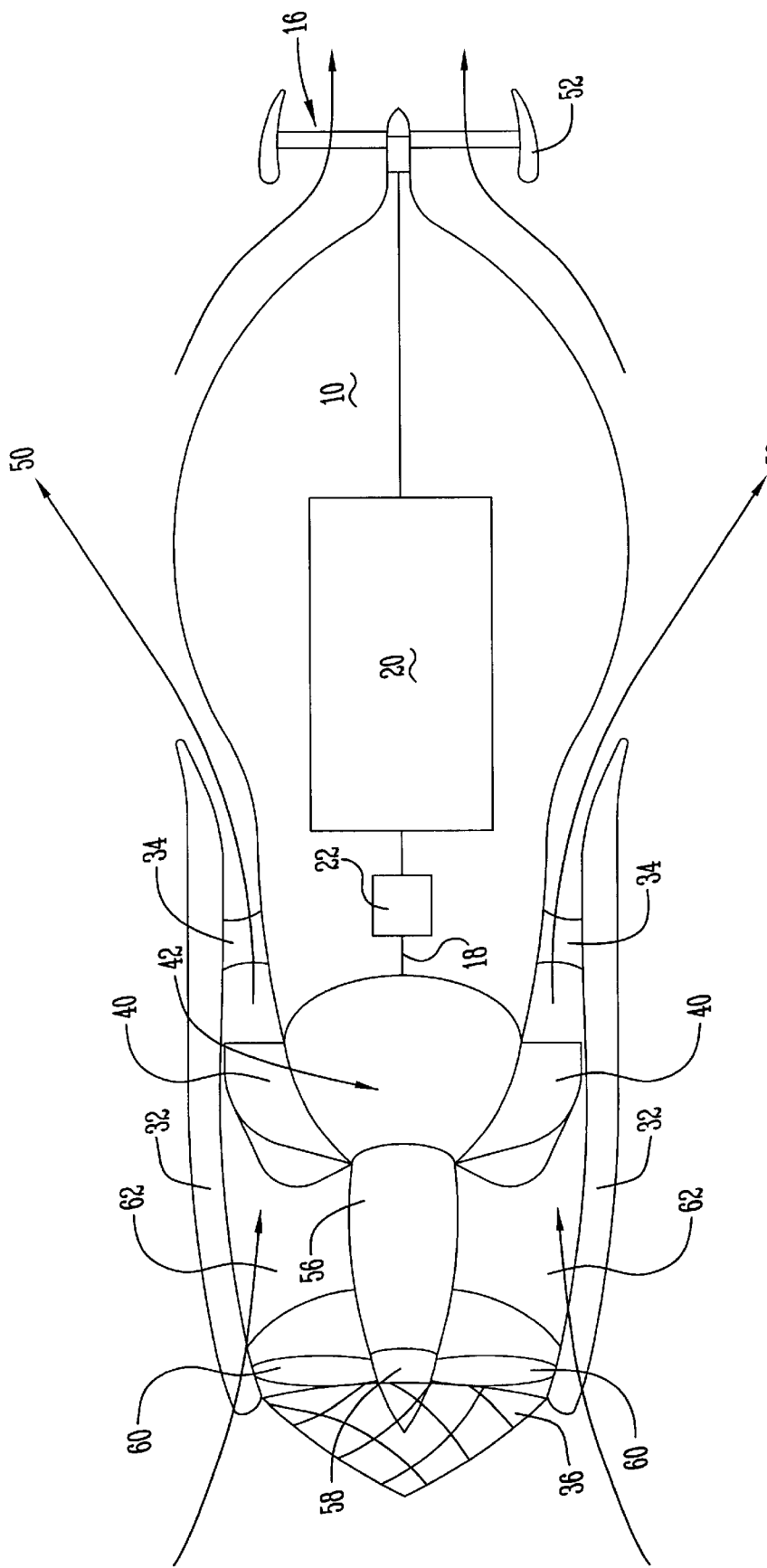
FIG. 4 is similar to FIG. 3, but shows an alternative embodiment of the propulsion system.

The rear or stern propeller 16 can be used in combination with the front jet for higher speed as shown in FIG. 4. The stern propeller 16 does a lot to manage turbulence in the vacuum-like void behind the moving submarine 10. It helps to minimize the creation of a suction-like turbulent area, behind the moving submarine 10, which would pull it backward and slow forward progress. This area of lower pressure is generated by the submarine's passage through the water, creating a void behind it. Because water is incompressible, turbulent flow rapidly equalizes pressure.

Combining bow propulsion with stern propulsion reduces cavitation for moving the same mass through the water. Reducing frontal pressure wave generation and rear suction turbulence drag, as well as some surface friction drag are not the only reasons; cavitation is further reduced by flow retardation in the front jet, which pressurizes blade areas.

In an alternate embodiment, a pumpjet design could be used, both on the bow 14 and on the stern 12. A pumpjet 52, shown in FIG. 5, eliminates cavitation-generating propeller blade tips by attaching the blades to a rotating shroud (in addition to pressurizing cavitation-prone blade areas), reducing cavitation even more.

Cavitation could be even further reduced by running communication nozzles 78 through the rotating shroud 56, connecting areas of higher pressure in the jet constriction behind the blades 54 with areas of lower pressure in front of the blades 78, raising the pressure in this cavitation-prone area. In addition, the counter current will create a vortex effect. The vortex loop not only reduces blade cavitation, but it increases kinetic energy and acts as an additional impeller to increase speed, without further increase in power. The pumpjet may also contain similar communication nozzles 78 through the rotating pumpjet hub 60.

An alternate embodiment may also have the vortex loop system running through the structure of the propeller blades 54 themselves. There may be one or more loops through each blade 54, even including multiple perforations throughout each blade 54 in cavitation-prone areas. The low-pressure cavitation-prone areas then communicate with behind-the-blade areas of higher pressure (in the jet constriction) and resist formation of water vapor bubbles on the blade surface. The multiple perforated-propeller form of cavitation suppression is somewhat different than that with the shroud-based vortex loop configuration (with a more clearly defined circular counterflow channel), in that a true vortex loop is less well-defined. However, applications beyond vortex loops in water jets exist for any propeller-driven craft, using perforated propellers.

Figure 7:
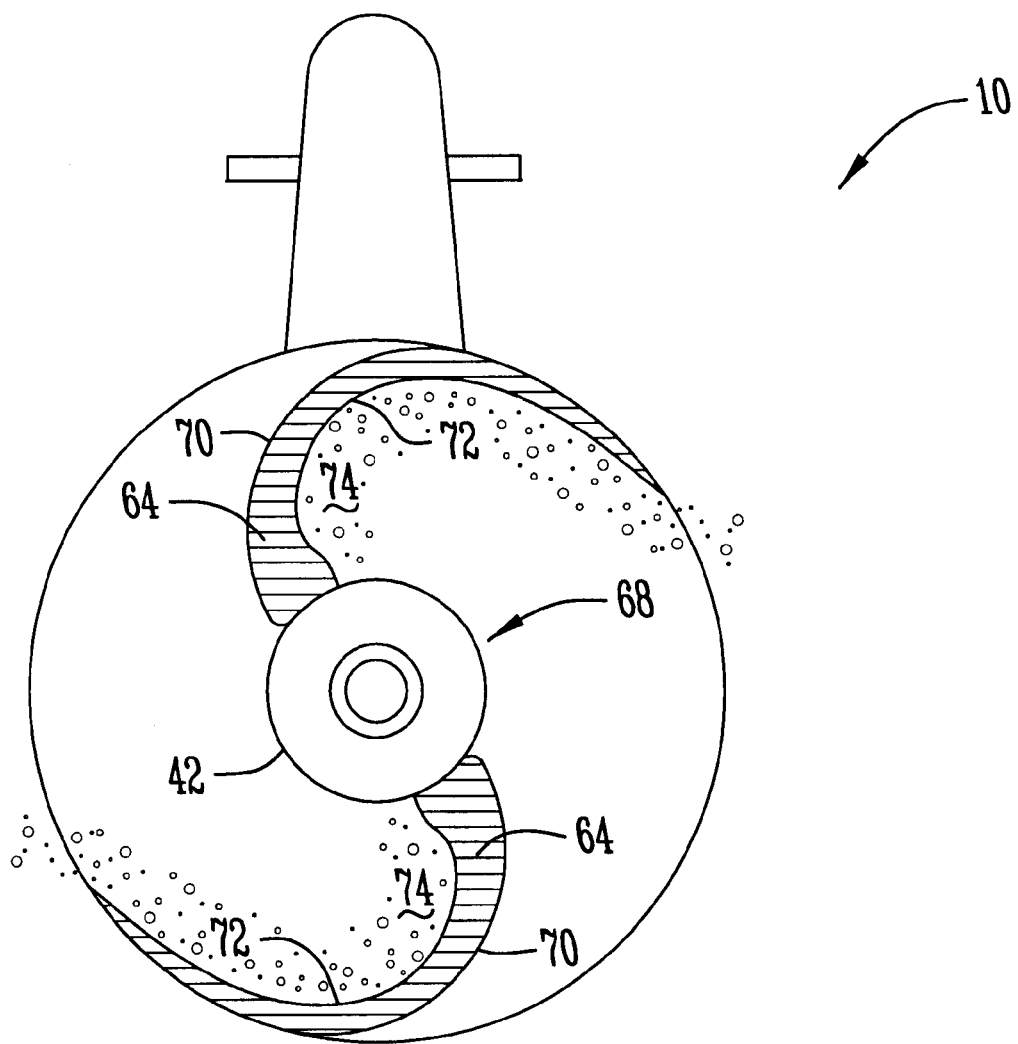
FIG. 7 is frontal view of the embodiment shown in FIG. 6.

The particulars of the design of propulsion system can be varied according to desire. U.S. Pat. Nos. 5,383,801, and 4,902,254 to Chas, incorporated herein by reference, illustrate and describe structures for over the water vehicle jet thrusters that could be applied in a present situation but enlarged as indicated to cover the entire bow 14 of submarine 10 as shown in FIGS. 6 and 7. Vanes 34 must be designed to provide sufficient structural support and rigidity for shroud 32.

In the preferred embodiment, submarine 10 is on the order of a Sea Wolf class submarine 10, or at least a submarine big enough to utilize a nuclear reactor. However, it could be used on other under water vehicles of any size and configured accordingly, including, but not limited to personal submarines, torpedoes, and other non-personnel carrying craft. It is to be further understood that the propulsion unit 26 is dynamically designed according to desired performance characteristics.

Figure 8C:
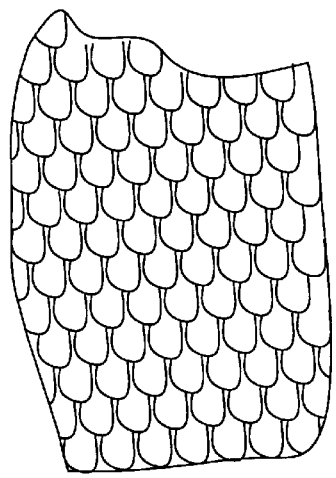
FIG. 8B shows the texturing typical of small shingles on a roof and FIG. 8C shows the texturing typical of sharkskin or fish scales.
Figure 8B:
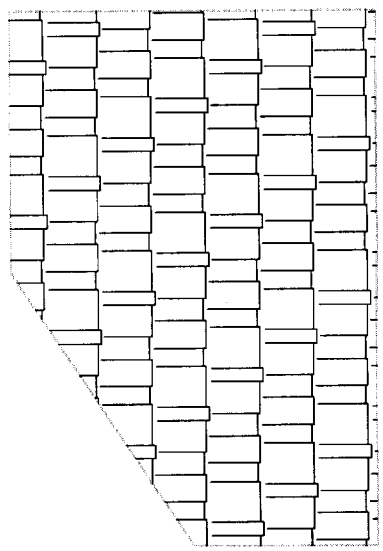
Figure 8A:
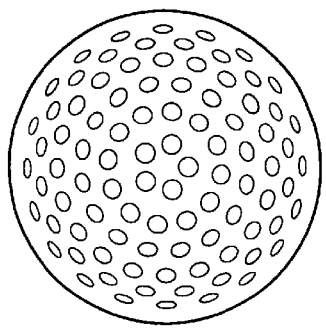
FIG. 8A shows the surface texturing on a golf ball.

Drag could be further reduced by adding a surface texture treatment, examples of which are shown in FIGS. 8A, 8B, and 8C. This surface texturing can be applied on the rubber coating or anechoic tiles. A variety of surface textures can be applied, including a texture that resembles the skin of a shark or the small scales of a fish (FIG. 8C), texture like shingles on a roof (FIG. 8B), and texturing similar to the dimples on a golf ball (FIG. 8A). In this alternate embodiment, texture variation is targeted only to problem areas. For example, as the submarine 10 exterior contour begins to taper towards the stern 12, increasing the size of the scales or golf ball-like dimples will allow the flow of water to follow the submarine contour more closely, reducing the magnitude of the vacuum-like void that creates suction that leads to greater turbulence.

Smaller size texturing would be utilized in more forward areas along the hull where boundary layer drag problems interfere to a lesser degree. The surface drag is due to viscous shear forces of the moving water against the surface of the submarine, resulting in eddies and turbulence that cause deceleration, sapping the submarine's momentum. The turbulence and eddies increase with increase in submarine speed.

In another alternate embodiment, parallel longitudinal ridges, like those found on a phonograph record, would also allow the water to flow as close to the surface as possible, without touching it, thereby reducing the turbulence close to the surface. For example, 40 micron phonograph-like ridges in the middle area of the submarine and sail would create a shear-protected layer of similar magnitude, preventing eddies of high-speed fluid from contacting the surface. As the submarine 10 and sail taper toward the stern 12, the size of the texturing would increase, to duplicate the golf ball-dimple effect.

Yet another alternate embodiment that would help control the surface friction and prevent, or at least delay, the onset of turbulence and micro-cavitation phenomena, is a special material outer coating. Examples of this would be a fluid-backed rubber coating or a "mammal skin" polymer, that duplicates dolphin or whale skin hydrodynamics. In this case, variation in texture might be replaced or combined with polymer variation or varying fluid layers in the anechoic tile.

An alternative propulsion system is shown in FIG. 4. It utilizes essentially the same configuration of FIG. 3, including a hub 42, with blades 40, in a shroud 32. However, additionally, an extension 56 extends out to a hub 58 upon which a plurality of blades or a fan 60 rotates. By appropriate transmission, not shown, the front-most fan 60 can turn at a different speed than blades 40 on hub 42. Struts 62 are spaced apart radially from extension 56 to hold shroud 32. In the preferred embodiment, it is contemplated there could be four struts 62 but this number could vary according to desire.

Similar to certain jet airplane engines, the configuration of FIG. 4 could operate as follows. Water would be moved at a high velocity by fan 60 at a rate greater than the flow of water into the inlet 26 of the submarine 10. Water at a higher velocity from the fan 60, is then passed by blades 40. The second set of straight, slightly angled blades 40 may or may not be counter rotating. Water at a greater velocity from the blades 40 is then passed into the nozzle region 50. Water at the higher velocity is thus exhausted out of nozzle region 50 as an exhaust jet to provide very high velocity water jet propulsion in a slightly diverged straight line.

At propeller blade 40 speeds greater than fifty meters per second, formation of a large supercavity is possible. Only the blades 40, not the vessel 10, need to move at this speed to generate the supercavity, making smooth transition to very high speed possible and practical. For example, a 12.2 meter wide sea wolf has a circumference of 38.33 meters. To reach blade speeds of 50 meters/second, it will require slightly more than one revolution per second in the second set of blades (60 rpm). Realizing that turbines such as a dental handpiece, can rotate at 400,000 rpm, supercavitation is not difficult to achieve. A simple model of a 2 centimeter wide dental handpiece in an aquarium has a 6.3 centimeter circumference. 1000 revolutions per second (60,000 rpm) will generate a supercavity. At high blade speed, supercavity generation would envelop the submarine 10 and minimize all surface friction beyond the shroud. This area would be in a water vapor filled vacuum. The drag or friction of the supercavity bubble is negligible.

Figure 5:
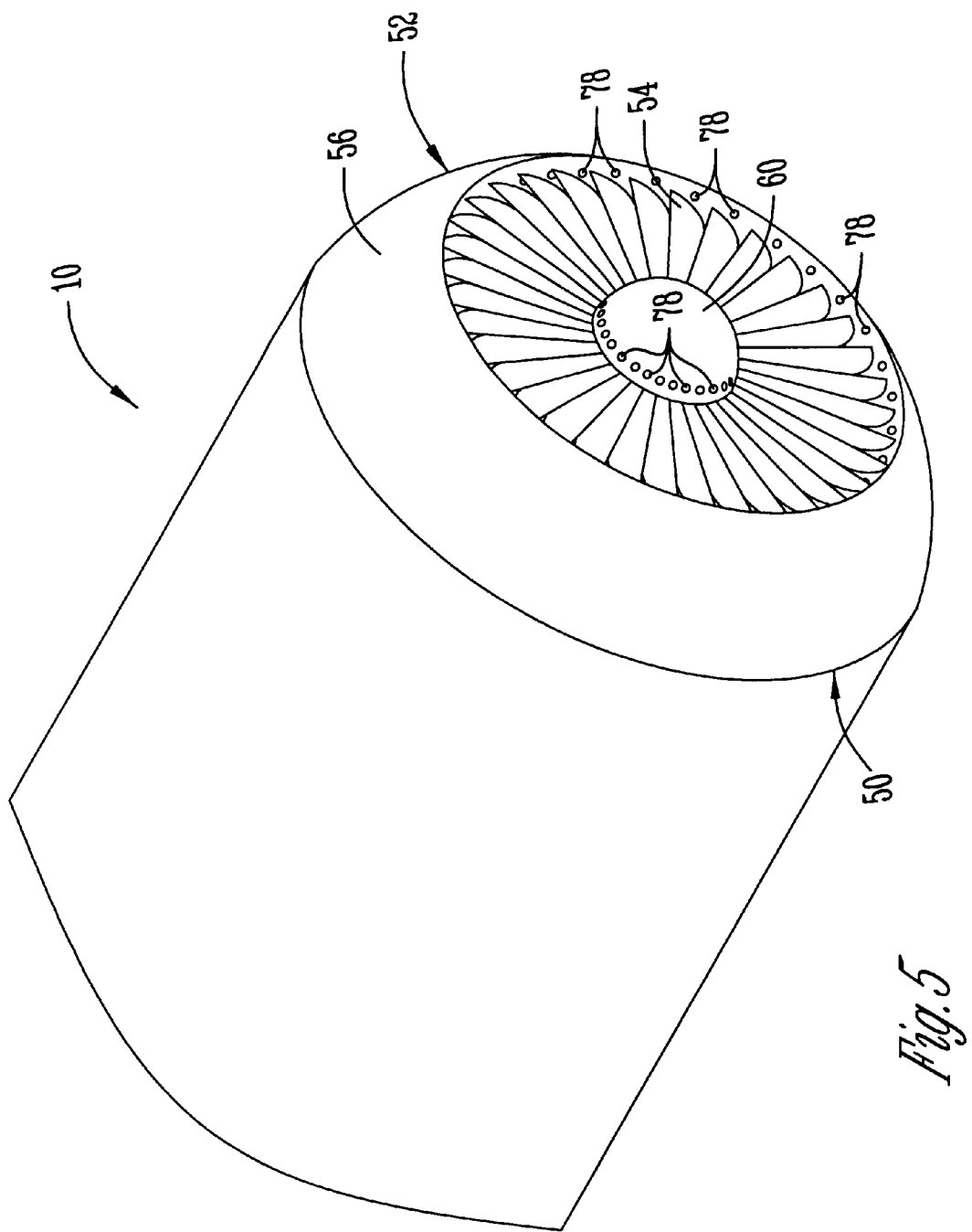
FIG. 5 is another alternative embodiment of the invention incorporating a pumpjet.

In another embodiment, a pumpjet 52, shown in FIG. 5, could replace the screen and forward set of blades shown in FIG. 4. A foremost pumpjet 52 could provide increased speeds at stealth, and when selectively engaged, the second stage propellers 60 could provide a generated supercavity, which would eliminate frictional drag of the submarine 10 exterior surface. This would enable the submarine 10 to go from higher stealth speed to very high supercavitating speeds and back again to stealth, whenever desired.

Instead of large straight blades 54 with very little pitch, as seen in FIG. 5, large, sweeping centrifugal force blades 64, shown in FIG. 6, could be utilized. Their direction may or may not be counter rotating. One or more blades 64 are spirally wound and attached to the stage two 66. This configuration will generate a supercavity even more efficiently. The blades 64 provide clearance from the shroud 32, so any debris that passes the blades 54 of stage one is easily carried through the jet. Upon the application of power from the turbine 20 through a drive shaft 18 to the spiral-bladed hub 66 of stage two, spiral-bladed hub 66 spins. This spin turns the propellers 64, which in turn adds additional momentum to the water in the area enclosed within the pumpjet shroud 56. This twice-accelerated water vaporizes and flows past the spirally wound supercavitating blades into the nozzle region 50. The nozzle region 50 is dynamically designed to provide maximum thrust.

Combined with the forward propulsion of the stage one pumpjet 52, the stage two centrifugal-force hub 66 generates a supercavity from the water taken through the two stages. In operation, the propeller blades 64 (FIGS. 6 & 7) are spun on the hub 66 at a rate approaching 50 meters/second, generating the formation of a supercavity, and thereby creating a "bubble" exhaust jet. This oversized bubble of vaporized water is then forced into the nozzle region 50 defined by the pumpjet shroud 56 and remaining body of the submarine 10. The trailing edge of the shroud 56, along with lower pressure from rapid water vapor acceleration through the nozzle region 50 further enhances the supercavity. The supercavity envelops the entire submarine, including the stern propeller 16. The size of the submarine 10 should be as large as the supercavity can reliably cover. Ventilating or supplementing the supercavity with additional gas from a surface snorkel (not shown), can greatly increase the size and stability of the supercavity.

FIG. 7 shows an embodiment of the present invention, which is a supercavitation propeller 68 having two blades 64. The curved outer surface of each blade 64 forms a volute curve wound spiral-like, beginning from the respective opposite points on the periphery of the water intake and each winding spirally around the intake in about 180 degrees. The front edge 70 of the blades 64 is rounded so as to facilitate the smooth passing of any solid matters. As shown in FIG.

6, after the forward end portion of the inner surface 72 of blade 64 is wound in about 90 degrees along the periphery of the intake 26, the recess 74 is then radially formed on the inner surface 72 of the blade 64 from the point of 90 degrees from the front edge 70 whereby the incipient or initial cavitation is formed in the area of recess 74, and the initial cavitation grows along the inner surface 72 of each blade 64 to form a long and stable supercavitation and thereby to stabilize the liquid flow. Supercavity shape could be modified to provide clearance for turns by the use of increased cavity ventilation or retractable flap-like projections 76, shown in FIG. 6 behind the nozzle region 50; these modifications could also be used for turning the craft.

A general description of the present invention as well as preferred embodiments of the present invention have been set forth above. Those skilled in the art to which the present invention pertains will recognize and be able to practice additional variations in the methods and systems described which fall within the teachings of this invention.

Accordingly, all such modifications and additions are deemed to be within the scope of the invention, which is to be limited only by the claims appended hereto.

What is claimed is:

1. A water propulsion system for a submersible vehicle including a body, bow and stern ends, and a power source, the propulsion system comprising:
    a pump jet including a plurality of blades secured to a hub, the blades extending from the hub to a secured position on a shroud, the pump jet being secured to the submersible at a location away from the stern; and
    a second set of curved blades rotationally secured to a second hub.
2. The propulsion system of claim 1 further comprising: means for creating a supercavity.
3. The propulsion system of claim 1 further comprising: flaps secured to the side of the submersible for maneuvering the submersible.
4. The propulsion system of claim 1 wherein water flows from in front of the blades to an area behind the blades, the propulsion system further comprising:
    a channel in the shroud for circulating water from the area behind the blades to an area in front of the blades.
5. The propulsion system of claim 1 wherein water flows from in front of the blades to an area behind the blades, the propulsion system further comprising:
    a channel in the hub for circulating water from the area behind the blades to an area in front of the blades.
6. The propulsion system of claim 1 wherein water flows from in front of the blades to an area behind the blades, the propulsion system further comprising:
    a channel in one or more of the blades for circulating water from the area behind the blades to an area in front of the blades.
7. The propulsion system of claim 1 wherein a supercavity is formed, the propulsion system further comprising:
    means for stabilizing the supercavity.
8. The propulsion system of claim 1 wherein the submersible includes a varied surface texture coating.
9. The propulsion system of claim 8 wherein the varied surface texture coating covers the entire submersible.
10. A method for propelling an underwater vehicle, the method comprising:
    operating a power source within the underwater vehicle;
    rotating a first plurality of blades operatively connected to a first hub and to a shroud, the first hub being located away from the stern end of the underwater vehicle, said first hub being operatively connected to the power source;
    rotating a second plurality of blades operatively connected to a second hub and to a shroud, the second hub being operatively connected to the power source; and
    pushing water with said blades into a nozzle for increased thrust.
11. A drag reducing coating for a submersible vehicle, the coating comprising:
    a plurality of anechoic tiles secured to submersible; and
    a varied surface texture applied to the tiles.
12. The drag reducing coating for a submersible vehicle of claim 11 wherein the varied surface texture is applied to the entire surface of the submersible.
13. A water propulsion system for a submersible vehicle including a body, bow and stern ends, and a power source, the propulsion system comprising:
    a pump jet including a plurality of blades secured to a hub, the blades extending from the hub to a secured position on a shroud, the pump jet being secured to the submersible at a location away from the stern; and
    a channel in the shroud for circulating water from the area behind the blades to an area in front of the blades.
14. A water propulsion system for a submersible vehicle including a body, bow and stern ends, and a power source, the propulsion system comprising:
    a pump jet including a plurality of blades secured to a hub, the blades extending from the hub to a secured position on a shroud, the pump jet being secured to the submersible at a location away from the stern; and
    a channel in the hub for circulating water from the area behind the blades to an area in front of the blades.
15. A water propulsion system for a submersible vehicle including a body, bow and stern ends, and a power source, the propulsion system comprising:
    a pump jet including a plurality of blades secured to a hub, the blades extending from the hub to a secured position on a shroud, the pump jet being secured to the submersible at a location away from the stern; and
    a channel in one or more of the blades for circulating water from the area behind the blades to an area in front of the blades.

\* \* \* \* \*